(12) United States Patent
Lu et al.

(10) Patent No.: US 11,222,236 B2
(45) Date of Patent: Jan. 11, 2022

(54) IMAGE QUESTION ANSWERING METHOD, APPARATUS AND SYSTEM, AND STORAGE MEDIUM

(71) Applicant: BEIJING SENSETIME TECHNOLOGY DEVELOPMENT CO., LTD., Beijing (CN)

(72) Inventors: Pan Lu, Beijing (CN); Hongsheng Li, Beijing (CN); Xiaogang Wang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 118 days.

(21) Appl. No.: 16/798,359

(22) Filed: Feb. 22, 2020

(65) Prior Publication Data

US 2020/0193228 A1 Jun. 18, 2020

Related U.S. Application Data

(63) Continuation of application No. PCT/CN2018/112735, filed on Oct. 30, 2018.

(30) Foreign Application Priority Data

Oct. 31, 2017 (CN) .......................... 201711049294.7

(51) Int. Cl.
*G06K 9/62* (2006.01)
*G06F 40/30* (2020.01)
(Continued)

(52) U.S. Cl.
CPC ........... *G06K 9/6256* (2013.01); *G06F 40/30* (2020.01); *G06K 9/2054* (2013.01); *G06K 9/4676* (2013.01)

(58) Field of Classification Search
CPC .. G06K 9/6256; G06K 9/4676; G06K 9/2054; G06F 40/30
See application file for complete search history.

(56) References Cited

U.S. PATENT DOCUMENTS 9,082,040 B2  7/2015  Cai
9,965,705 B2  5/2018  Chen et al.
(Continued)

FOREIGN PATENT DOCUMENTS

CN   105574133 A   5/2016
CN   106649542 A   5/2017
(Continued)

OTHER PUBLICATIONS

First Office Action of the Japanese application No. 2020-511894, dated Feb. 2, 2021.
(Continued)

*Primary Examiner* — Kevin Ky
(74) *Attorney, Agent, or Firm* — Syncoda LLC; Feng Ma

(57) ABSTRACT

An image question answering method includes: extracting a question feature representing a semantic meaning of a question, a global feature of an image, and a detection frame feature of a detection frame encircling an object in the image; obtaining a first weight of each of at least one area of the image and a second weight of each of at least one detection frame of the image according to question feature, global feature, and detection frame feature; performing weighting processing on global feature by using first weight to obtain an area attention feature of image; performing weighting processing on detection frame feature by using second weight to obtain a detection frame attention feature of image; and predicting an answer to question according to question feature, area attention feature, and detection frame attention feature.

17 Claims, 8 Drawing Sheets

(51) Int. Cl.
　　　*G06K 9/20*　　　(2006.01)
　　　*G06K 9/46*　　　(2006.01)

(56) References Cited

U.S. PATENT DOCUMENTS

| | | | |
|---|---|---|---|
| 10,198,671 B1* | 2/2019 | Yang | ............................ G06T 7/11 |
| 10,754,851 B2* | 8/2020 | Cohen | ............... G06F 16/24578 |
| 10,997,233 B2* | 5/2021 | He | ......................... G06F 16/334 |
| 2012/0290577 A1 | 11/2012 | Cai | |
| 2016/0350653 A1 | 12/2016 | Socher et al. | |
| 2017/0124432 A1* | 5/2017 | Chen | ....................... G06F 40/30 |

FOREIGN PATENT DOCUMENTS

| | | |
|---|---|---|
| CN | 107256228 A | 10/2017 |
| CN | 108228703 A | 6/2018 |
| JP | 2017091525 A | 5/2017 |

OTHER PUBLICATIONS

First Office Action of the Singaporean application No. 11202001737S, dated Jan. 1, 2021.
International Search Report in the international application No. PCT/CN2018/112735, dated Feb. 3, 2019.
English Translation of the Written Opinion of the International Search Authority in the international application No. PCT/CN2018/112735,, dated Feb. 3, 2019.
Co-attending Free-form Regions and Detections with Multi-modal Multiplicative Feature Embedding for Visual Question Answering.
First Office Action of the Chinese application No. 201711049294.7, dated Mar. 27, 2019.
Second Office Action of the Chinese application No. 201711049294.7, dated Nov. 12, 2019.
Notice of Allowance of the Chinese application No. 201711049294.7, dated Apr. 1, 2020.

* cited by examiner

IMAGE QUESTION ANSWERING METHOD, APPARATUS AND SYSTEM, AND STORAGE MEDIUM

CROSS-REFERENCE TO RELATED APPLICATIONS

This application is a continuation of International Application No. PCT/CN2018/112735, filed on Oct. 30, 2018, which claims priority to Chinese Patent Application No. 201711049294.7, filed on Oct. 31, 2017. The disclosures of these applications are incorporated herein by reference in their entirety.

BACKGROUND

Recently, an image question answering task attracts much attention in the field of artificial intelligence. Image question answering is also called Visual Question Answering (VQA) and relates to such working requirement: answering a question consisting of a natural language according to an image. VQA, as an exemplary representation of an interaction between the language and the image, may be applied to multiple working scenes such as intelligent monitoring and image screening.

SUMMARY

The present disclosure relates to the field of CV (Computer Vision), and in particular, to an image question answering method, apparatus and system, and a storage medium The present disclosure provides technical solutions of image question answering.

One aspect of embodiments of the present disclosure provides an image question answering method. The image question answering method includes: extracting a question feature representing a semantic meaning of a question, a global feature of an image, and a detection frame feature of a detection frame encircling an object in the image; obtaining a first weight of each of at least one area of the image and a second weight of each of at least one detection frame of the image according to the question feature, the global feature, and the detection frame feature; performing weighting processing on the global feature by using the first weight to obtain an area attention feature of the image; performing weighting processing on the detection frame feature by using the second weight to obtain a detection frame attention feature of the image; and predicting an answer to a question according to the question feature, the area attention feature, and the detection frame attention feature.

Another aspect of the embodiments of the present disclosure provides an image question answering apparatus. The image question answering apparatus includes: a feature extractor for extracting the question feature representing the semantic meaning of the question, the global feature of the image, and the detection frame feature of the detection frame encircling the object in the image; a weight calculator for obtaining the first weight of each of at least one area of the image and the second weight of each detection frame in at least one detection frame of the image according to the question feature, the global feature, and the detection frame feature; an area attention extractor for performing weighting processing on the global feature by using the first weight to obtain the area attention feature of the image; a detection frame attention extractor for performing weighting processing on the detection frame feature by using the second weight to obtain the detection frame attention feature of the image; and a predictor for predicting the answer to the question according to the question feature, the area attention feature, and the detection frame attention feature.

Another aspect of the embodiments of the present disclosure provides an image question answering system. The image question answering system includes: a memory for storing executable instructions; and one or more processors. One or more processors communicate with the memory to execute the executable instructions so as to complete an operation corresponding to the image question answering method provided in the embodiments of the present disclosure, for example, including but not limited to performing the following operations: extracting the question feature representing the semantic meaning of the question, the global feature of the image, and the detection frame feature of the detection frame encircling the object in the image; obtaining the first weight of each of at least one area of the image and the second weight of each of at least one detection frame of the image according to the question feature, the global feature, and the detection frame feature; performing weighting processing on the global feature by using the first weight to obtain the area attention feature of the image; performing weighting processing on the detection frame feature by using the second weight to obtain the detection frame attention feature of the image; and predicting the answer to the question according to the question feature, the area attention feature, and the detection frame attention feature.

Yet another aspect of the embodiments of the present disclosure provides an electronic device, including a processor, where the processor includes the image question answering apparatus according to any one of the foregoing embodiments.

Yet another aspect of the embodiments of the present disclosure provides an electronic device, including: a memory for storing the executable instructions;

and a processor for communicating with the memory to execute the executable instructions, when the executable instructions are executed, the processor is configured to extract a question feature representing a semantic meaning of a question, a global feature of an image, and a detection frame feature of a detection frame encircling an object in the image; obtain a first weight of each of at least one area of the image and a second weight of each of at least one detection frame of the image according to the question feature, the global feature, and the detection frame feature; perform weighting processing on the global feature by using the first weight to obtain an area attention feature of the image; performing weighting processing on the detection frame feature by using the second weight to obtain a detection frame attention feature of the image; and predict an answer to a question according to the question feature, the area attention feature, and the detection frame attention feature.

Yet another aspect of the embodiments of the present disclosure provides a non-transitory computer readable storage medium capable of storing computer readable instructions, where if the computer readable instructions are executed, the processor can perform an operation corresponding to any one of the image question answering methods provided in the embodiments of the present disclosure, for example, including but not limited to performing the following operations: extracting the question feature representing the semantic meaning of the question, the global feature of the image, and the detection frame feature of the detection frame encircling the object in the image; obtaining the first weight of each of at least one area of the image and the second weight of each of at least one detection frame of the image according to the question feature, the global feature, and the detection frame feature; performing weighting processing on the global feature by using the first weight to obtain the area attention feature of the image; performing weighting processing on the detection frame feature by using the second weight to obtain the detection frame attention feature of the image; and predicting the answer to the question according to the question feature, the area attention feature, and the detection frame attention feature.

Yet another aspect of the embodiments of the present disclosure provides a computer program product, including computer readable codes, where if the computer readable codes run on a device, the processor in the device executes the instructions for implementing the image question answering method according to any one of the foregoing embodiments.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
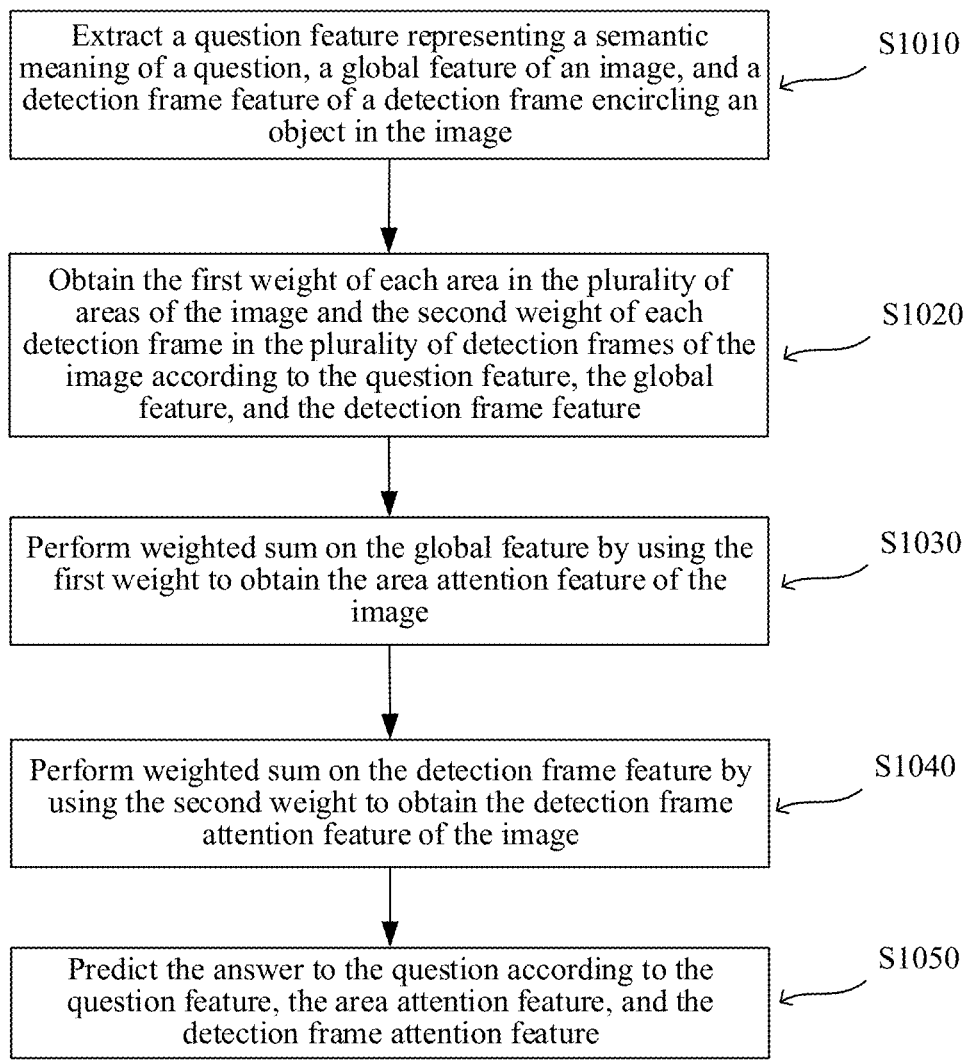
FIG. 1 is a schematic flowchart of an embodiment of an image question answering method provided in the embodiments of the present disclosure.

By comprehensively considering the global feature of the image and the detection frame feature of the detection frame including the object on the basis of the semantic meaning of the question, the technical solutions of the present disclosure more comprehensively analyze an interaction between the image and the question, so that the efficiency and accuracy of image question answering are improved.

Various exemplary embodiments of the present disclosure are now described in detail with reference to the accompanying drawings. It should be noted that, unless otherwise stated specifically, relative arrangement of the components, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, Personal Computer (PC) systems, server computer systems, thin clients, thick clients, handheld or laptop devices, microprocessor-based systems, set top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. The computer systems/servers may be practiced in the distributed cloud computing environments in which tasks are executed by remote processing devices that are linked through a communications network. In the distributed cloud computing environments, the program modules may be located in local or remote computing system storage media including storage devices.

It should be noted that the embodiments in the present disclosure and the features in the embodiments may be combined with each other in the case of no conflict. The following describes the present disclosure in detail with reference to the accompanying drawings in conjunction with the embodiments.

FIG. 1 is a schematic flowchart of an embodiment of an image question answering method 1000 provided in the embodiments of the present disclosure. The method may be performed by any electronic device, such as a terminal device, a server, a mobile device, and the like. As shown in FIG. 1, the method of the embodiments includes the following operations.

At operation S1010, a question feature representing a semantic meaning of a question, a global feature of an image, and a detection frame feature of a detection frame encircling an object in the image are extracted.

Figure 2:
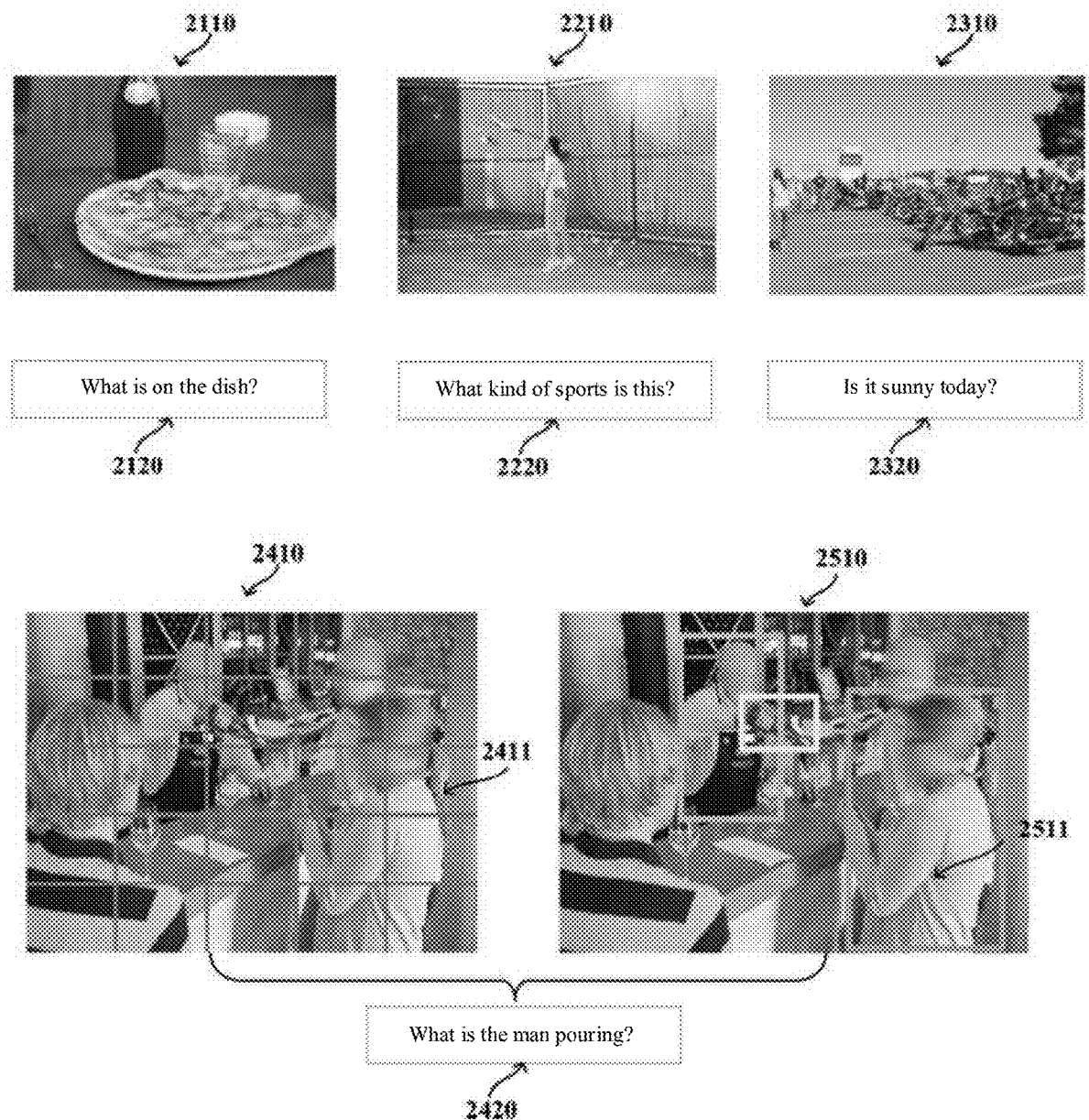
FIG. 2 is a schematic diagram of some embodiments of an image and a question related to the image provided in the embodiments of the present disclosure.

The question may be a question sentence associated with the image and consisting of the natural language. FIG. 2 is a schematic diagram of some embodiments of the image and the question related to the image provided in the embodiments of the present disclosure. With reference FIG. 2, for example, the question is a question 2120 related to an image 2110, i.e., "what is on the dish?", a question 2220 related to an image 2210, i.e., "what kind of sports is this?", and a question 2320 related to an image 2310, i.e., "is it sunny today?" and the like. The question feature of the question may be extracted by using a deep learning network. The question feature, for example, may be represented as a feature vector, and the feature vector includes a semantic representation of the question.

The global feature of the image, for example, may be expressed as a feature vector, and the feature vector includes a semantic representation of content of all areas of the image. At said operation, feature extraction content of the image is not limited, i.e., the foreground content (including an object and the like) and the background content of the image are not distinguished. Therefore, the global feature of the image may reserve global visual content of the image and specific foreground content required for answering the question.

The extracting the detection frame feature of the detection frame encircling the object in the image is different from the extracting the global feature of the image, firstly the foreground content and the background content of the image may need to be distinguished. The foreground content in the image may be marked by using the detection frame, for example, the object and the like. The detection frame, for example, may be rectangular and may encircle the object in the image. When the detection frame feature is extracted, only the image feature in the detection frame is extracted. The detection frame feature, for example, is represented as the feature vector, and the feature vector includes a semantic representation of the content in the detection frame. Therefore, the detection frame feature may filter out a large amount of background information, thereby predicting the question related to the foreground content more efficiently and accurately.

In some optional examples, the operation S1010 may be performed by the processor by invoking a corresponding instruction stored in the memory, or may also be performed by a feature extractor 2100 run by the processor.

At operation S1020, the first weight of each area in the plurality of areas of the image and the second weight of each detection frame in the plurality of detection frames of the image are obtained on the basis of the question feature, the global feature, and the detection frame feature. The operation introduces a visual attention mechanism. The visual attention mechanism may preliminarily associate the question with the image, thereby setting different attention weights for different parts of the image. The attention weight reflects an association level between the part and the question. The image part closely associated with the question may be efficiently concerned by introducing the visual attention mechanism, thereby improving the prediction efficiency and accuracy.

The embodiments of the present disclosure introduce a double-channel visual attention mechanism. In a first branch, the visual attention mechanism is introduced on the basis of a natural partition of the image. The natural partition of the image indicates dividing the image into one or more areas in a natural position relationship without distinguishing the foreground content and the background content of the image. For example, as shown in FIG. 2, an image 2410 and an image 2510 both include the same image content and have a same associated question 2420, i.e., "what is the man pouring?". The image 2410 is divided into N×N areas 2411 on the basis of horizontal and vertical coordinates of image 2410, where N is an integer greater than or equal to 1, for example, in an example shown in FIG. 2, the image 2410 is divided into 5×5 areas. The visual attention mechanism introduced on the basis of the natural partition preliminarily associates the question with the N×N areas of the image, respectively, so as to obtain the association level between each area in the N×N areas and the question. Such association level may be represented in a weight form. That is, the first weight of each area in the plurality of areas of the image may be obtained by introducing the visual attention mechanism on the basis of the natural partition of the image.

The advantage of introducing the visual attention mechanism on the basis of the natural partition of the image is that the global visual content of the image is reserved to a larger extent, and particularly, the background content is reserved better. For example, when the question 2320 related to the image 2310, i.e., "is it sunny today?" as shown in FIG. 2 is answered, since the question is actually related to the background content (sky) of the image 2310, the introducing the visual attention mechanism on the basis of the natural partition of the image may perform answer prediction on such questions better.

In a second branch, the visual attention mechanism is introduced on the basis of the detection frame of the image. The detection frame of the image identifies and encircles the foreground content (e.g., the object) of the image. The image may include one or more objects. Therefore, one or more detection frames may be generated in the image, for example, as shown in FIG. 2, M detection frames 2511 are generated in the image 2510, where M is an integer greater than or equal to 1. for example, in the example shown in FIG. 2, 4 detection frames are generated in the image 2510. The visual attention mechanism introduced on the basis of the detection frame of the image preliminarily associates the question with the M detection frames of the image, respectively, so as to obtain an association level between each of the M detection frames and the question. Such association level may be represented in the weight form. That is, the second weight of each detection frame in the plurality of detection frames of the image may be obtained by introducing the visual attention mechanism on the basis of the detection frame of the image.

The advantage of introducing the visual attention mechanism on the basis of the detection frame of the image is that the foreground content of the image is concerned more closely, so that the question related to the foreground content may be answered efficiently and accurately. For example, when the question 2120 related to an image 2110, i.e., "what is on the dish?" and the question 2220 related to the image 2210, i.e., "what kind of sports is this?" as shown in FIG. 2 are answered, the introducing visual attention mechanism on the basis of the detection frame of the image may ignore background information in the image 2110 and the image 2210, and meanwhile, a greater weight is configured for the detection frame encircling the dish and the detection frame encircling a bat, so that more efficient and accurate answer prediction is performed on such questions.

In some optional examples, the operation S1020 may be performed by the processor by invoking the corresponding instruction stored in the memory, or may be performed by a weight calculator 2200 run by the processor.

At operation S1030, weighted sum is performed on the global feature by using the first weight to obtain the area attention feature of the image. In the case that the image is divided into N×N areas on the basis of the horizontal and vertical coordinates of the image, the global feature may include the plurality of area features related to the plurality of areas of the image, for example, a global feature vector may be formed by linking N×N area feature vectors. At operation S1020, the first weight of each area in the N×N areas is obtained. Therefore, weighted sum may be performed on the N×N area feature vectors by using the N×N first weights, so as to obtain the area attention feature of the image, and the area attention feature, for example, may be represented in a vector form.

In some optional examples, the operation S1030 may be performed by the processor by invoking a corresponding instruction stored in the memory, or may also be performed by an area attention extractor 2300 run by the processor.

At operation S1040, weighted sum is performed on the detection frame feature by using the second weight to obtain the detection frame attention feature of the image. The detection frame feature may include the plurality of detection frame sub-features related to the plurality of detection frames of the image, for example, a detection frame feature vector may be formed by linking M detection frame sub-feature vectors. At the operation S1020, the second weight of each detection frame in the M detection frames is obtained. Therefore, weighted sum may be performed on the M detection frame sub-feature vectors by using the M second weights, so as to obtain the detection frame attention feature of the image, and the detection frame attention feature, for example, may be represented in the vector form.

In some optional examples, the operation S1040 may be performed by the processor by invoking a corresponding instruction stored in the memory, or may also be performed by a detection frame attention extractor 2400 run by the processor.

It should be noted that an order between the operation S1030 and the operation S1040 may be exchanged, i.e., the operation S1030 may be performed after the operation S1040 is performed.

At operation S1050, the answer to the question is predicted on the basis of the question feature, the area attention feature, and the detection frame attention feature. After the question feature, the area attention feature, and the detection frame attention feature are obtained, relationships between the question feature and the area attention feature and the detection frame attention feature may also be learnt. Such prediction process may be processed as a multi-classification task, for example, a learning result may be classified by using a classifier, and the answer to the question is predicted according to scores of a plurality of candidate answers. According to the technical solution of the present disclosure, due to the introduction of the double-channel visual attention mechanism, efficient and accurate answer prediction may be implemented in a plurality of VQA scenes.

In some optional examples, the operation S1050 is performed by the processor by invoking a corresponding instruction stored in the memory, or may also be performed by a predictor 2500 run by the processor.

In some optional embodiments of the present disclosure, the extracting the question feature may include: performing feature extraction on the context of the words constituting the question by using the RNN, and obtaining the question feature. According to any one of the foregoing embodiments, the question feature of the question may be extracted by using multiple kinds of deep learning networks, including but not limited to the CNN, the RNN and the like. The RNN, different from the CNN in the usual sense, may provide output information at a previous time point as one of input information of the next time point, and therefore has an ability to learn historical information.

According to any one of the foregoing embodiments, the question is generally a question sentence consisting of the natural language. Such sentence includes a plurality of words, and there is a contextual relationship among the words, for example, when a question "is an apple or a pear placed on the dining table?" is parsed, it may be predicted that a word related to foods is likely to appear in the following text after performing semantic feature extraction on the word "dining table". Therefore, in a process of question feature extraction, introducing the RNN having the ability to learn the historical information is beneficial.

The RNN may include multiple kinds of variations, such as a Long Short-Term Memory (LSTM) unit and a Gated Recurrent Unit (GRU). When feature extraction is performed on the question by using the RNN, first, the words constituting the question may be encoded in sequence into one-hot codes. One-hot encoding is an encoding mode that how many states the system has, how many bits the encoding has. In these bits, only one bit is 1, and the remaining bits are all 0, for example, the system sorts 5,000 words (i.e., 5,000 probable states), and therefore, the one-hot codes have 5,000 bits. In this case, the one-hot codes are viewed as a vector, and each element may only be 0 or 1. The bit of the element only corresponding to an input word is 1, and the remaining elements are all 0. In actual application, at least one bit may be reserved for the system for representing the words that are not sorted by the system. By means of the encoding mode of the one-hot codes, a text character may be converted to digitalized data. Then, semantic feature extraction may be performed on the question on the basis of the one-hot codes, for example, a one-hot code input at the current moment and the previously output one-hot code feature extraction result are jointly input into the RNN. The RNN may perform encoding processing on the jointly input content in consideration of the historical information, and thus the semantic feature of the current word is extracted.

In some optional embodiments of the present disclosure, the extracting the global feature may include: extracting the global feature by using the CNN, where the global feature includes the plurality of area features related to the plurality of areas of the image. An example of the CNN that may be used for performing global feature extraction of the image may include but is not limited to a ResNet network or a VGG-16 network. The CNN may aim at an application scene of an image identification task to perform pre-training by using an appropriate training sample set, such as ImageNet. The input image may be first adjusted to a size (e.g., the number of pixels) applicable to the used CNN, and then may be input to the CNN. The CNN may include a plurality of convolution kernels, and one feature channel output is obtained after performing a convolution operation on each convolution kernel and the image. The number of the convolution kernels (or the number of feature channels) of the CNN may be set according to the application scene of the image identification task. According to any one of the foregoing embodiments, in the case that the image is divided into N×N areas on the basis of the horizontal and vertical coordinates of the image, the global feature may include the plurality of area features related to the plurality of areas of the image, for example, the global feature is represented as the vector form, and the global feature vector may be formed by linking the N×N area feature vectors.

Figure 3:
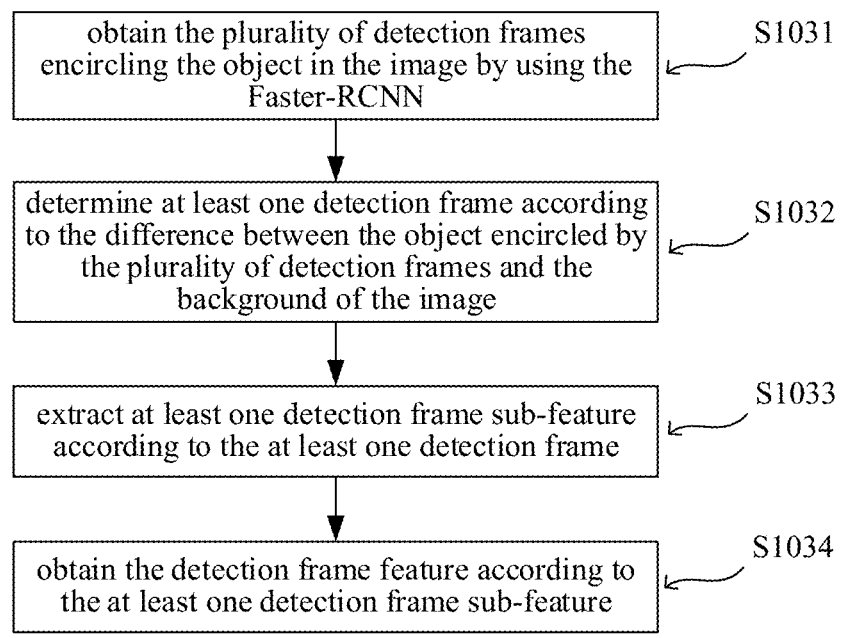
FIG. 3 is a schematic flowchart of one example of a method for extracting a detection frame feature provided in the embodiments of the present disclosure.

FIG. 3 is a schematic flowchart of one example of the method for extracting the detection frame feature provided in the embodiments of the present disclosure. With reference to FIG. 3, in one embodiment of the present disclosure, the extracting the detection frame feature may include: at operation S1031, obtaining the plurality of detection frames encircling the object in the image by using the Faster-RCNN; at operation S1032, determining at least one detection frame according to the difference between the object encircled by the plurality of detection frames and the background of the image; at operation S1033, extracting at least one detection frame sub-feature on the basis of the at least one detection frame; and at operation S1034, obtaining the detection frame feature on the basis of the at least one detection frame sub-feature.

In the embodiments of the present disclosure, the object and the background of the image may be first distinguished, which relates to an object identification technology. The Faster-RCNN is an efficient object identification network. The Faster-RCNN distinguishing from the RCNN and a Fast Region Convolutional Neural Network (Fast-RCNN) may automatically generate a candidate detection frame (Region Proposal).

After the candidate detection frame is generated, the Faster-RCNN may identify the image feature in the candidate detection frame, thereby determining whether the candidate detection frame encircles the object or the background. In the case that the candidate detection frame completely or partially encircles the object, the Faster-RCNN may further correct the size and position of the candidate detection frame, so as to completely encircle the object in the image in an appropriate size.

In actual application, the plurality of detection frames may be generated to encircle the plurality of objects in the image, for example, M' detection frames may be generated to encircle M' objects. The M' detection frames all map score values of the objects included in the M' detection frames, where the score value reflects a difference degree between the object and the background. The lower the score value, the smaller the difference between the object and the background. In the present embodiment, M detection frames is selected from the M' detection frames according to the score values in a descending order to perform subsequent feature extractions, where M is less than or equal to M'; the detection frame sub-feature is extracted from a part of selected detection frames; and finally, the extracted detection frame sub-feature is synthesized into the detection frame feature. The detection frame feature is extracted by means of the mode above, so that the detection frame may be independently generated to reduce human intervention. In addition, by selecting a part of detection frames greatly different from the background, object information having high quality may be extracted as far as possible, so as to provide an image parsing result having strong pertinence for the VQA task related to the foreground content.

Figure 4:
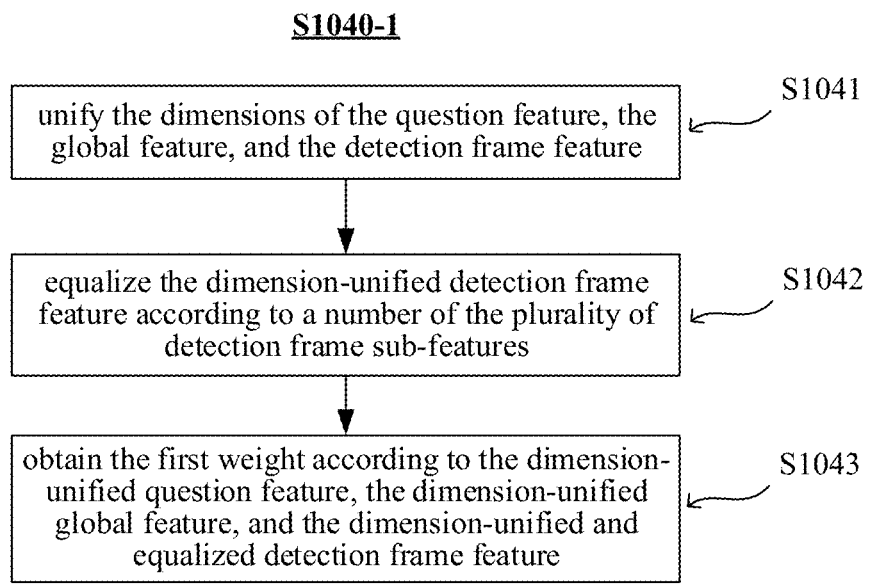
FIG. 4 is a schematic flowchart of one example of a method for obtaining a first weight provided in the embodiments of the present disclosure.

FIG. 4 is a schematic flowchart of one example of the method for obtaining the first weight provided in the embodiments of the present disclosure. With reference to FIG. 4, in some optional embodiments of the present disclosure, the obtaining the first weight S1040-1 may include: at operation S1041, unifying the dimensions of the question feature, the global feature, and the detection frame feature; at operation S1042, equalizing a dimension-unified detection frame feature on the basis of the number of the plurality of detection frame sub-features; and at operation S1043, obtaining the first weight on the basis of a dimension-unified question feature, a dimension-unified global feature, and a dimension-unified and equalized detection frame feature.

After the question feature, the global feature, and the detection frame feature are obtained, the visual attention mechanism may be introduced on the basis of the natural partition of the image. The image may be divided into the N×N areas on the basis of the horizontal and vertical coordinates. The visual attention mechanism introduced on the basis of the natural partition preliminarily associates the question with the N×N areas of the image, respectively, so as to obtain the association level between each area in the N×N areas and the question. Optionally, according to any one of the foregoing embodiments, the M detection frames may be selected from the image to perform the subsequent feature extractions, and the extracted features are linked into the detection frame feature. The features extracted from the M detection frames are M detection frame sub-features constituting the detection frame feature. According to any one of the foregoing embodiments, the question feature, the global feature, and the detection frame feature all may be represented as the vector forms. Therefore, the dimensions of the three vectors may be unified to facilitate subsequent operations. In the present embodiment, the detection frame feature may be equalized on the basis of the number M of the detection frame sub-features so as to better learn and understand the global visual content of the image.

Optionally, the equalizing process and the dimension unification process may be represented by the following equation (1):

$$R_1 = \tanh(W_{r1}R + b_{r1}),$$
$$D_1 = \frac{1}{M} \cdot 1(\tanh(W_{d1}D + b_{d1})^T),$$
$$Q_1 = \tanh(W_{q1}Q + b_{q1})$$

(1)

In equation (1), Q is a question feature vector, R is a global feature vector, and D is a detection frame feature vector; $Q_1$ is the dimension-unified question feature, $D_1$ is the dimension-unified and equalized detection frame feature, and $R_1$ is the dimension-unified global feature. $W_{q1}$, $b_{q1}$, $W_{r1}$, $b_{r1}$, $W_{d1}$, and $b_{d1}$ respectively are network parameters updated by using machine learning, and may be used to unify the dimensions of the question feature vector Q, the global feature vector R and the detection frame feature vector D. M represents the number of the detection frame sub-features, tanh( ) is a hyperbolic tangent function, and 1 represents an all-ones vector.

Finally, the first weight may be obtained on the basis of the dimension-unified question feature $Q_1$, the dimension-unified global feature $R_1$, and the dimension-unified and equalized detection frame feature $D_1$, for example, the dimension-unified question feature $Q_1$, the dimension-unified global feature $R_1$, and the dimension-unified and equalized detection frame feature $D_1$ are added or multiplied element by element. In some optional embodiments, a multiplying mode is adopted, such as performing Hadamard product. In the embodiment, the first weight is obtained by multiplying the dimension-unified question feature $Q_1$, the dimension-unified global feature $R_1$, and the dimension-unified and equalized detection frame feature $D_1$, so that more accurate weight information may be obtained. In some optional operations, L2 norm regularization may be performed after multiplying to limit a norm of the vector.

For example, the operation above may be represented by the following equation (2):

$$C_1 = \text{Norm}_2(\tilde{Q}_1 \circ R_1 \circ \tilde{D}_1)$$

(2)

In equation (2), $C_1$ represents a joint feature representation of the dimension-unified question feature $Q_1$, the dimension-unified global feature $R_1$, and the dimension-unified and equalized detection frame feature $D_1$; $Norm_2$ represents L2 norm regularization, and ○ represents Hadamard product.

$C_1$ is viewed as the first weight in the vector form and includes weight information of the plurality of areas of the image. In actual operation, further convolution operation is performed on the joint feature representation $C_1$ and activation is performed by using a Softmax function on the joint feature representation $C_1$.

For example, the operation above may be represented by the following equation (3):

$$a_1 = \text{softmax}(W_{c1} * C_1 + b_{c1}) \quad (3)$$

In equation (3), $a_1$ is a first weight in a scalar form, and $W_{c1}$ and $b_{c1}$ are network parameters updated by using machine learning.

Figure 5:
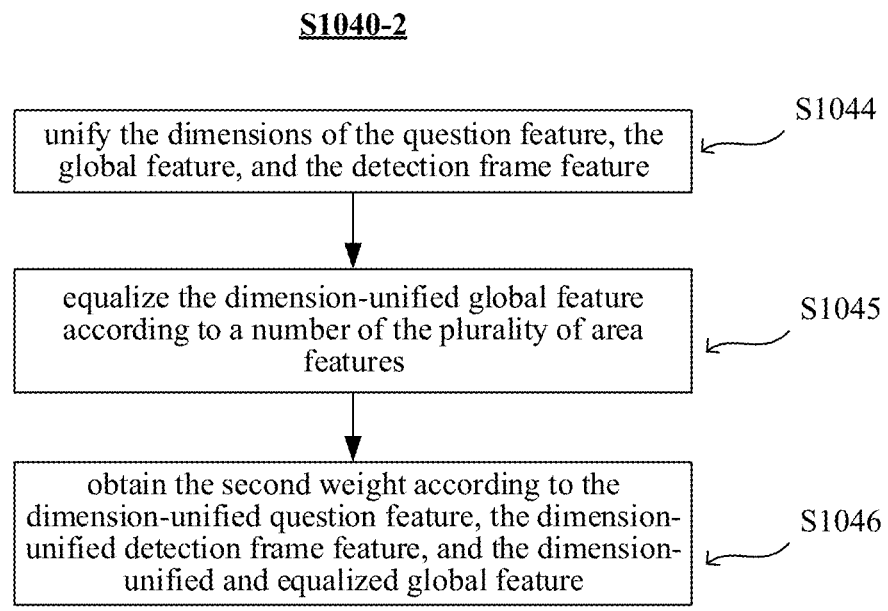
FIG. 5 is a schematic flowchart of one example of a method for obtaining a second weight provided in the embodiments of the present disclosure.

FIG. 5 is a schematic flowchart of one example of the method for obtaining the second weight provided in the embodiments of the present disclosure. With reference to FIG. 5, in an embodiment of the present disclosure, the obtaining the second weight S1040-2 may include: at operation S1044, unifying the dimensions of the question feature, the global feature, and the detection frame feature; at operation S1045, equalizing a dimension-unified global feature on the basis of the number of the plurality of area features; at operation S1046, obtaining the second weight on the basis of a dimension-unified question feature, a dimension-unified detection frame feature, and a dimension-unified and equalized global feature.

After the question feature, the global feature, and the detection frame feature are obtained, the visual attention mechanism may be introduced on the basis of the detection frame of the image. In the case that the M detection frames are generated in the image, the detection frame feature may include M detection frame sub-feature related to the M detection frames of the image. The visual attention mechanism introduced on the basis of the detection frame of the image preliminarily associates the question with the M detection frames of the image, respectively, so as to obtain an association level between each of the M detection frames and the question. Optionally, according to any one of the foregoing embodiments, the image may include N×N areas. Feature vector extraction is performed on the N×N areas, and N×N area features related to the N×N areas of the image are obtained. According to any one of the foregoing embodiments, the question feature, the global feature, and the detection frame feature all may be represented as the vector form. Therefore, the dimensions of the three vectors may be unified to facilitate subsequent operations. In the present embodiments, the dimension-unified global feature are equalized on the basis of the number of the plurality of area features N×N.

Optionally, the equalizing process and the dimension unification process may be represented by the following equation (4):

$$D_2 = \tanh(W_{d2}D + b_{d2}), \quad (4)$$
$$R_2 = \frac{1}{N \times N} \cdot 1(\tanh(W_{r2}R + b_{r2})^T),$$
$$Q_2 = \tanh(W_{q2}Q + b_{q2})$$

In equation (4), Q is the question feature vector, R is the global feature vector, and D is the detection frame feature vector; $Q_2$ is the dimension-unified question feature, $D_2$ is the dimension-unified detection frame feature, and $R_2$ is the dimension-unified and equalized global feature $W_{q2}$, $b_{q2}$, $W_{r2}$, $b_{r2}$, $W_{d2}$, and $b_{d2}$ respectively are network parameters updated by using machine learning, and may be used to unify the dimensions of the question feature vector Q, the global feature vector R and the detection frame feature vector D. N×N represents the number of the image areas, tanh( ) is the hyperbolic tangent function, and 1 represents an all-ones vector.

Finally, the second weight may be obtained on the basis of the dimension-unified question feature $Q_2$, the dimension-unified detection frame feature $D_2$, and the dimension-unified and equalized global feature $R_2$; for example, the dimension-unified question feature $Q_2$, the dimension-unified detection frame feature $D_2$, and the dimension-unified and equalized global feature $R_2$ are added or multiplied element by element. In some embodiments, the multiplying mode is adopted, such as performing Hadamard product. In the embodiments, the second weight is obtained by multiplying the dimension-unified question feature $Q_2$, the dimension-unified detection frame feature $D_2$, and the dimension-unified and equalized global feature $R_2$, so that more accurate weight information may be obtained. In some optional operations, L2 norm regularization may be performed after multiplying to limit the norm of the vector.

For example, the operation above may be represented by the following equation (5):

$$C_2 = \text{Norm}_2(\tilde{Q}_2 \circ \tilde{R}_2 \circ D_2) \quad (5)$$

In equation (5), $C_2$ represents the joint feature representation of the dimension-unified question feature $Q_2$, the dimension-unified detection frame feature $D_2$, and the dimension-unified and equalized global feature $R_2$; $Norm_2$ represents L2 norm regularization, and ○ represents Hadamard product.

C2 is viewed as the second weight in the vector form and includes weight information of at least one detection frame of the image. In actual operations, further convolution operation is performed on the joint feature representation $C_2$ and Softmax activation is performed on the joint feature representation $C_2$.

For example, the operation above may be represented by the following equation (6):

$$a_2 = \text{softmax}(W_{c2}C_2 + b_{c2}) \quad (6)$$

In equation (6), $a_2$ is a second weight in the scalar form, and $W_{c2}$ and $b_{c2}$ are network parameters updated by using machine learning.

In some optional embodiments of the present disclosure, in the case of obtaining the first weight $a_1$ and the second weight $a_2$ on the basis of the foregoing embodiments, optionally, with reference to the description of FIG. 1, the operation S1050 and operation S1060 are respectively represented as the following equations (7) and (8):

$$v_1 = \Sigma_i^{N \times N} a_1(i) R_1(i) \quad (7)$$

In equation (7), weighted sum may be performed on the N×N area feature vectors by using the N×N first weights $a_1$, so as to obtain the area attention feature of the image, and the area attention feature, for example, may be represented in a vector form $v_1$.

$$v_2 = \Sigma_i^M a_2(i) D_2(i) \quad (8)$$

In equation (8), weighted sum may be performed on the M detection frame sub-feature vectors by using the M second weights $a_2$, so as to obtain the detection frame attention feature of the image, and the detection frame attention feature, for example, may be represented in the vector form $v_2$.

Figure 6:
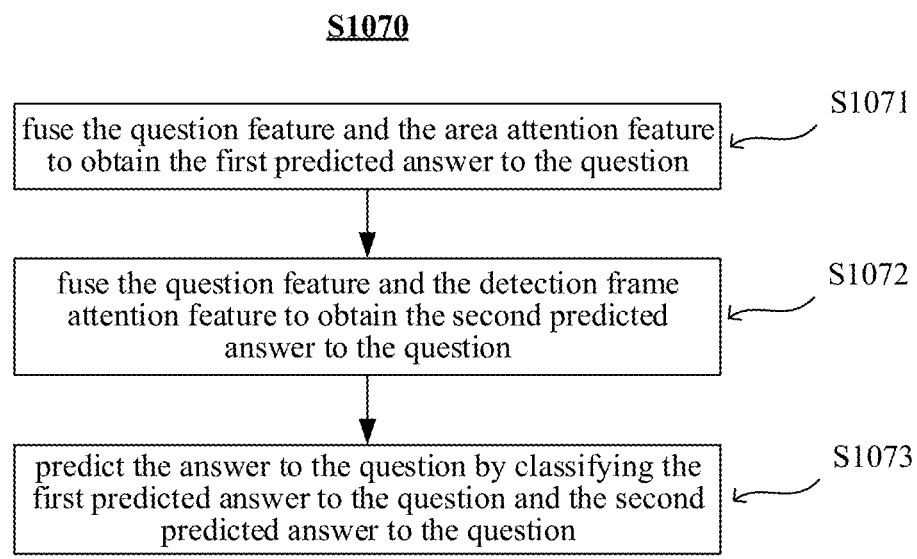
FIG. 6 is a schematic flowchart of one example of a method for predicting an answer to a question provided in the embodiments of the present disclosure.

FIG. 6 is a schematic flowchart of one example of the method for predicting the answer to the question provided in the embodiments of the present disclosure. With reference to FIG. 6, in some embodiments of the present disclosure, the predicting the answer to the question may include: in operation S1071, fusing the question feature and the area attention feature to obtain the first predicted answer to the question; in operation S1072, fusing the question feature and the detection frame attention feature to obtain the second predicted answer to the question; in operation S1073, predicting the answer to the question by classifying the first predicted answer to the question and the second predicted answer to the question.

In the embodiments of the present disclosure, question prediction may be processed as a multi-target classification task. For example, the question feature may be further learnt, and the further learnt question feature is multiplied with the area attention feature, thereby obtaining the first prediction of the question. Similarly, the question feature may be further learnt, and the further learnt question feature is multiplied with the detection frame attention feature, thereby obtaining the second prediction of the question.

Optionally, the operations above may be represented as the following equation (9):

$$h_r = v_1 \circ \tand(W_{hr}Q + b_{hr})$$

$$h_d = v_2 \circ \tand(W_{hd}Q + b_{hd}) \quad (9)$$

where $h_r$ is the first predicted answer to the question, $h_d$ is the second predicted answer to the question; $W_{hr}$, $b_{hr}$, $W_{hd}$, and $b_{hd}$ are network parameters updated by using machine learning, and the question feature may be further learnt, thereby enhancing a representation capability. The first predicted answer to the question $h_r$ may more accurately answer a question related to global visual content, and the second predicted answer to the question $h_d$ may more accurately answer a question related to foreground content. Finally, the first predicted answer to the question $h_r$ and the second predicted answer to the question $h_d$ are added, and linear classification is performed on the sum of t the second predicted answer to the question $h_r$ and the second predicted answer to the question $h_d$, thereby finally predicting the answer to the question. For example, linear transformation is performed on the sum of the first predicted answer to the question $h_r$ and the second predicted answer to the question $h_d$, and the Softmax function is applied to predict a final answer to the question.

For example, the operation above may be represented by the following equation (10):

$$p_{ans} = \softmax(W_p(h_r + h_d) + b_p) \quad (10)$$

where $P_{ans}$ represents the probability of predicting the answer to the question, and $W_p$ and $b_p$ are network parameters updated by using machine learning. for example, an answer that the value of $P_{ans}$ is maximum is selected as the final answer to the question, or the values of $P_{ans}$ are arranged in a descending order, so as to select a plurality of answers that the value of $P_{ans}$ is maximum as a candidate answer for a user to select. According to the present embodiment, on one hand, processes of the first predicted answer to the question and the second predicted answer to the question are performed independently, and therefore, different types of information may be captured from the image as much as possible; on the other hand, answer prediction may adapt to a plurality of VQA scenes better by combining the double-channel prediction.

The fusion operation of the feature vector mentioned in the foregoing embodiments of the present disclosure may use multiple kinds of modes, such as adding and multiplying. Optionally, Hadamard product is used in the exemplary embodiments of the present disclosure. In the embodiments of the present disclosure, since the dimensions of the feature vectors all keep consistent, using Hadamard product is more appropriate. In addition, using Hadamard product may also reduce computing burden, thereby improving the execution efficiency of the method.

As understood by a person skilled in the art, the networks above only may be applied after training. Training may be completed by using a conventional Back-Propagation (BP) method and/or a Back-Propagation Through Time (BPTT) method. A person skilled in the art may obtain these training methods on the basis of the disclosure of the present disclosure. Therefore, details are not described repeatedly in the present specification.

A person of ordinary skill in the art may understand that: all or some operations for implementing the foregoing method embodiments are achieved by a program by instructing related hardware; the foregoing program may be stored in a computer-readable storage medium; when the program is executed, operations including the foregoing method embodiments are executed. Moreover, the foregoing storage medium includes various media capable of storing program codes, such as a ROM, a RAM, a magnetic disk, or an optical disk.

Figure 7:
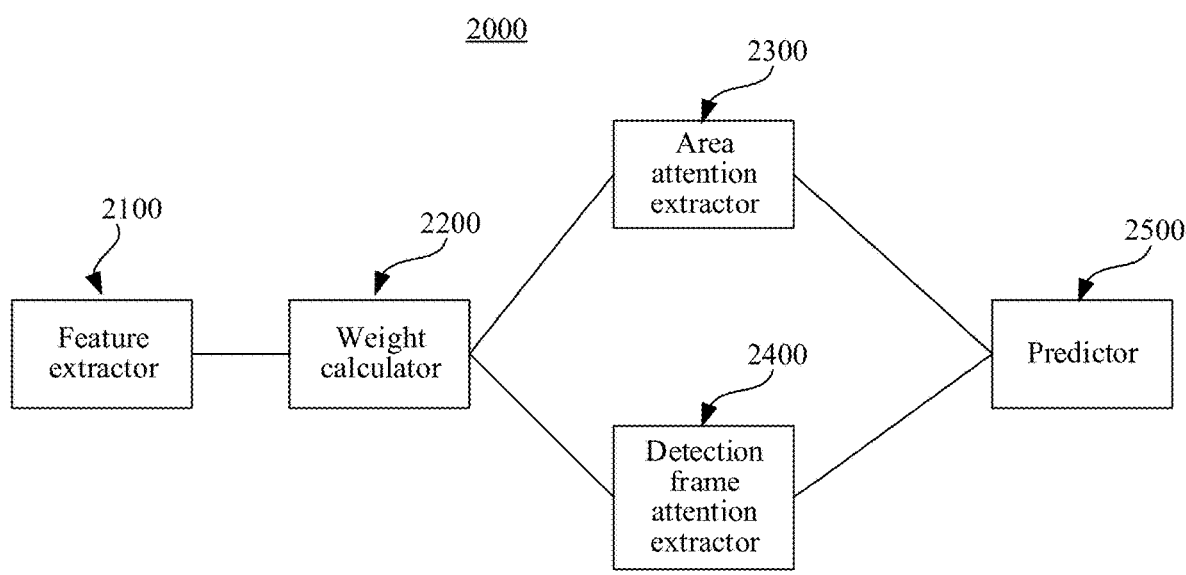
FIG. 7 is a schematic structural diagram of an embodiment of an image question answering apparatus provided in the embodiments of the present disclosure.

FIG. 7 is a schematic structural diagram of an embodiment of an image question answering apparatus 2000 provided in the embodiments of the present disclosure. The apparatus of the embodiment is used for implementing the foregoing method embodiments of the present disclosure. As shown in FIG. 7, the apparatus of the embodiment includes: the image question answering apparatus 2000 includes the feature extractor 2100, the weight calculator 2200, the area attention extractor 2300, the detection frame attention extractor 2400, and the predictor 2500. The feature extractor 2100 extracts the question feature representing the semantic meaning of the question, the global feature of the image, and the detection frame feature of the detection frame encircling the object in the image; the weight calculator 2200 obtains the first weight of each of at least one area of the image and the second weight of each of at least one detection frame of the image on the basis of the question feature, the global feature, and the detection frame feature; the area attention extractor 2300 performs weighting processing on the global feature by using the first weight to obtain the area attention feature of the image; the detection frame attention extractor 2400 performs weighting processing on the detection frame feature by using the second weight to obtain the detection frame attention feature of the image; and the predictor 2500 predicts the answer to the question on the basis of the question feature, the area attention feature, and the detection frame attention feature.

The feature extractor 2100 is configured with the RNN. The feature extractor 2100 may perform feature extraction on the basis of the context of the words constituting the question by using the RNN to obtain the question feature.

The feature extractor 2100 is configured with the CNN. The feature extractor 2100 may extract the global feature by using the CNN, where the global feature includes the plurality of area features related to the plurality of areas of the image.

The feature extractor 2100 may include: the detection frame generator configured with the Faster-RCNN of the plurality of detections frames for encircling the object in the image; the detection frame selector for determining at least one detection frame according to the difference between the object encircled by the plurality of detection frames and the background of the image; the detection frame sub-feature extractor for extracting at least one detection frame sub-feature on the basis of the at least one detection frame; and the feature synthesizer for obtaining the detection frame feature on the basis of the at least one detection frame sub-feature.

The weight calculator 2200 may include: the first dimension unification unit for unifying the dimensions of the question feature, the global feature, and the detection frame feature; the detection frame equalizer for equalizing a dimension-unified detection frame feature on the basis of the number of the plurality of detection frame sub-features; and the first weight obtaining unit, where the first weight obtaining unit obtains the first weight on the basis of the dimension-unified question feature, the dimension-unified global feature, and the dimension-unified and equalized detection frame feature.

The weight calculator 2200 may include: the second dimension unification unit for unifying the dimensions of the question feature, the global feature, and the detection frame feature; the area equalizer for equalizing a dimension-unified global feature on the basis of the number of the plurality of area features; and the second weight obtaining unit, where the second weight obtaining unit obtains the second weight on the basis of the dimension-unified question feature, the dimension-unified detection frame feature, and the dimension-unified and equalized global feature.

The predictor 2500 may include: the area predictor for fusing the question feature and the area attention feature to obtain the first predicted answer to the question; the detection frame predictor for fusing the question feature and the detection frame attention feature to obtain the second predicted answer to the question; and the dual-mode analyzer for obtaining the answer to the question by classifying the first predicted answer to the question and the second predicted answer to the question.

According to another aspect of the embodiments of the present disclosure, provided is an electronic device, including a processor, where the processor includes the image question answering apparatus provided in any one of the foregoing embodiments.

According to yet another aspect of the embodiments of the present disclosure, provided is an electronic device, including: a memory for storing an executable instruction; and a processor for communicating with the memory to execute the executable instruction so as to complete operations of the image question answering method provided in any one of the foregoing embodiments.

According to yet another aspect of the embodiments of the present disclosure, provided is a computer storage medium for storing a computer readable instruction. When the instruction is executed, the operations of the image question answering method provided in any one of the foregoing embodiments are executed.

In the embodiments of the present disclosure, the neural networks are separately a multi-layer neural network (i.e., a deep neural network), such as a multi-layer CNN, for example, any neural network model such as LeNet, AlexNet, GoogLeNet, VGG, and ResNet. The neural networks can adopt the neural network of the same type and structure, and can also adopt the neural networks of different types and structures, which is not limited in the embodiments of the present disclosure.

Figure 8:
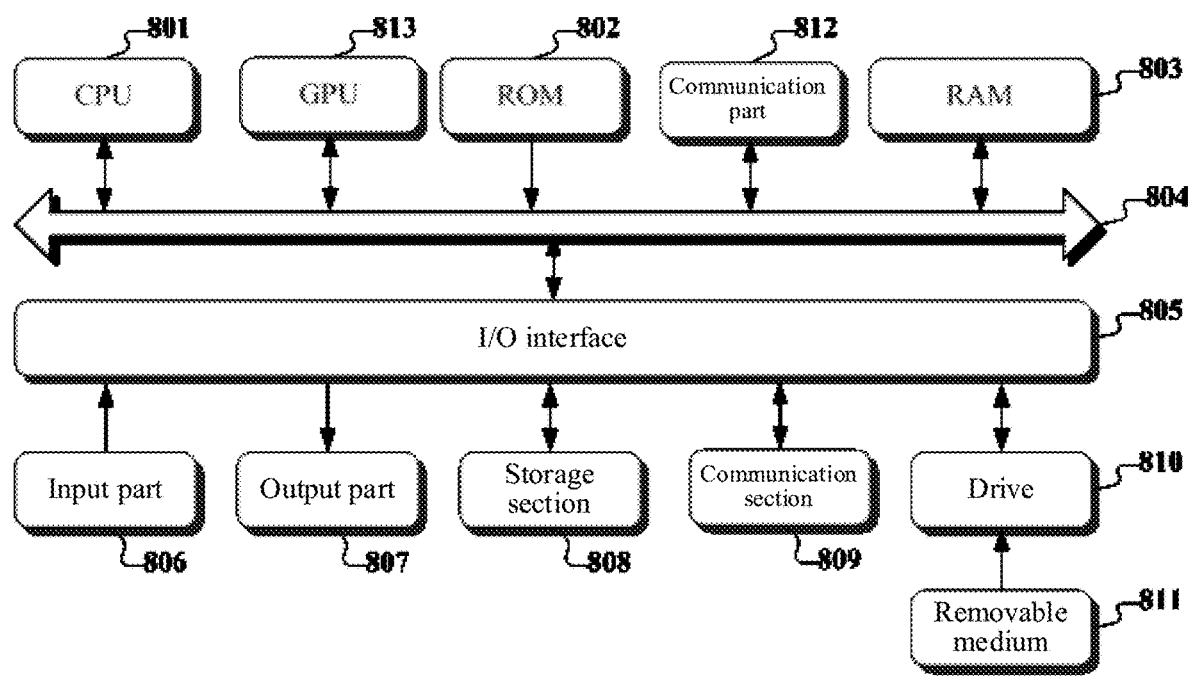
FIG. 8 is a schematic structural diagram of an embodiment of an image question answering system provided in the embodiments of the present disclosure.

The embodiments of the present disclosure further provide an electronic device which, for example, may be a mobile terminal, a PC, a tablet computer, a server, and the like. Referring to FIG. 8 below, a schematic structural diagram of an electronic device 800, which may be a terminal device or a server, suitable for implementing an embodiment of the present disclosure is shown. As shown in FIG. 8, the computer system 800 includes one or more processors, a communication part, and the like. The one or more processors are, for example, one or more Central Processing Units (CPUs) 801 and/or one or more Graphic Processing Units (GPUs) 813, and the processor may execute appropriate actions and processing according to executable instructions stored in a Read Only Memory (ROM) 802 or executable instructions loaded from a storage section 808 to a Random Access Memory (RAM) 803. The communication part 812 may include, but is be limited to, a network card. The network card may include, but is not limited to, an Infiniband (IB) network card.

The processor may communicate with the ROM 802 and/or the RAM 803 so as to execute the executable instructions, is connected to the communication part 812 by means of a bus 804, and communicates with other target devices by means of the communication part 812, thereby completing the operation corresponding to any method provided in the embodiments of the present disclosure, for example, extracting the question feature representing the semantic meaning of the question, the global feature of the image, and the detection frame feature of the detection frame encircling the object in the image; obtaining the first weight of each of at least one area of the image and the second weight of each of at least one detection frame of the image on the basis of the question feature, the global feature, and the detection frame feature; performing weighting processing on the global feature by using the first weight to obtain the area attention feature of the image; performing weighting processing on the detection frame feature by using the second weight to obtain the detection frame attention feature of the image; and predicting the answer to the question on the basis of the question feature, the area attention feature, and the detection frame attention feature.

In addition, the RAM 803 further stores programs and data required for operations of an apparatus. The CPU 801, the ROM 802, and the RAM 803 are connected to each other by means of the bus 804. In the case that the RAM 803 exists, the ROM 802 is an optional module. The RAM 803 stores executable instructions, or writes the executable instructions to the ROM 802 during running, where the executable instructions enable the CPU 801 to perform corresponding operations of the foregoing communication method. An Input/Output (I/O) interface 805 is also connected to the bus 804. The communication part 812 is integrated, or is also configured to have multiple sub-modules (for example, multiple IB network cards) connected to the bus.

The following components are connected to the I/O interface 805: an input section 806 including a keyboard, a mouse and the like; an output section 807 including a Cathode-Ray Tube (CRT), a Liquid Crystal Display (LCD), a speaker and the like; a storage section 808 including a hard disk and the like; and a communication section 809 of a network interface card including an LAN card, a modem and the like. The communication section 809 performs communication processing via a network such as the Internet. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be noted that the architecture illustrated in FIG. 8 is merely an optional implementation mode. During specific practice, the number and types of the components in FIG. 8 are selected, decreased, increased, or replaced according to actual requirements. Different functional components are separated or integrated or the like. For example, the GPU 813 and the CPU 801 are separated, or the GPU 813 is integrated on the CPU 801, and the communication part are separated from or integrated on the CPU 801 or the GPU 813 or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, including a computer program tangibly included on a machine readable medium. The computer program includes program codes for executing the method shown in the flowchart. The program codes may include corresponding instructions for correspondingly executing the operations of the method provided in the embodiments of the present disclosure, for example, extracting the question feature representing the semantic meaning of the question, the global feature of the image, and the detection frame feature of the detection frame encircling the object in the image; obtaining the first weight of each of at least one area of the image and the second weight of each of at least one detection frame of the image on the basis of the question feature, the global feature, and the detection frame feature; performing weighting processing on the global feature by using the first weight to obtain the area attention feature of the image; performing weighting processing on the detection frame feature by using the second weight to obtain the detection frame attention feature of the image; and predicting the answer to the question on the basis of the question feature, the area attention feature, and the detection frame attention feature. In such embodiments, the computer program is downloaded and installed from the network by means of the communication section 809, and/or is installed from the removable medium 811. The computer program, when being executed by the CPU 801, executes the foregoing functions defined in the methods of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of operations of the method is merely for description, and unless otherwise stated particularly, is not intended to limit the operations of the method in the present disclosure. In addition, in some embodiments, the present disclosure may also be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to persons of ordinary skill in the art. The embodiments are selected and described to better describe a principle and an actual application of the present disclosure, and to make persons of ordinary skill in the art understand the present disclosure, so as to design various embodiments with various modifications applicable to particular use.

The invention claimed is:

1. An image question answering method, comprising:
   extracting a question feature representing a semantic meaning of a question, a global feature of an image, and a detection frame feature of a detection frame encircling an object in the image;
   obtaining a first weight of each of at least one area of the image and a second weight of each of at least one detection frame of the image according to the question feature, the global feature, and the detection frame feature;
   performing weighting processing on the global feature by using the first weight to obtain an area attention feature of the image;
   performing weighting processing on the detection frame feature by using the second weight to obtain a detection frame attention feature of the image; and predicting an answer to the question according to the question feature, the area attention feature, and the detection frame attention feature,
   wherein the extracting the detection frame feature of the detection frame encircling the object in the image comprises:
   obtaining a plurality of detection frames encircling the object in the image by using a faster-region convolutional neural network;
   determining at least one detection frame according to a difference between the object encircled by the plurality of detection frames and a background of the image;
   extracting at least one detection frame sub-feature according to the at least one detection frame; and
   obtaining the detection frame feature according to the at least one detection frame sub-feature.

2. The image question answering method according to claim 1, wherein the extracting the question feature representing the semantic meaning of the question comprises:
   performing feature extraction on a context of words constituting the question by using a recurrent neural network to obtain the question feature.

3. The image question answering method according to claim 1, wherein the extracting the global feature of the image comprises:
   extracting the global feature by using a convolutional neural network, wherein the global feature comprises a plurality of area features associated with a plurality of areas of the image.

4. The image question answering method according to claim 3, wherein the obtaining the second weight of each of at least one area of the image according to the question feature, the global feature, and the detection frame feature comprises:
  unifying dimensions of the question feature, the global feature, and the detection frame feature;
  equalizing the dimension-unified global feature according to a number of the plurality of area features; and
  obtaining the second weight according to the dimension-unified question feature, the dimension-unified detection frame feature, and the dimension-unified and equalized global feature.

5. The image question answering method according to claim 1, wherein the obtaining the first weight of each of at least one area of the image according to the question feature, the global feature, and the detection frame feature comprises:
  unifying the dimensions of the question feature, the global feature, and the detection frame feature;
  equalizing the dimension-unified detection frame feature according to a number of the at least one detection frame sub-features; and
  obtaining the first weight according to the dimension-unified question feature, the dimension-unified global feature, and the dimension-unified and equalized detection frame feature.

6. The image question answering method according to claim 1, wherein the predicting the answer to the question according to the question feature, the area attention feature, and the detection frame attention feature comprises:
  fusing the question feature and the area attention feature to obtain a first predicted answer to the question;
  fusing the question feature and the detection frame attention feature to obtain a second predicted answer to the question; and
  obtaining the answer to the question by classifying the first predicted answer to the question and the second predicted answer to the question.

7. An electronic device, comprising: memory configured to store executable instructions; and
a processor configured to communicate with the memory to execute the executable instructions, when the executable instructions are executed, the processor is configured to:
  extract a question feature representing a semantic meaning of a question, a global feature of an image, and a detection frame feature of a detection frame encircling an object in the image;
  obtain a first weight of each of at least one area of the image and a second weight of each of at least one detection frame of the image according to the question feature, the global feature, and the detection frame feature;
  perform weighting processing on the global feature by using the first weight to obtain an area attention feature of the image;
  perform weighting processing on the detection frame feature by using the second weight to obtain a detection frame attention feature of the image; and
  predict an answer to a question according to the question feature, the area attention feature, and the detection frame attention feature,
  wherein the processor is further configured to:
  obtain a plurality of detections frames encircling the object in the image by using a faster-region convolutional neural network;
  determine at least one detection frame according to a difference between the object encircled by the plurality of detection frames and a background of the image;
  extract at least one detection frame sub-feature according to the at least one detection frame; and
  obtaining the detection frame feature according to the at least one detection frame sub-feature.

8. The electronic device according to claim 7, wherein the processor is further configured to perform feature extraction on a context of words constituting the question by using the recurrent neural network to obtain the question feature.

9. The electronic device according to claim 7, wherein the processor is further configured to extract the global feature by using the convolutional neural network, wherein the global feature comprises a plurality of area features associated with a plurality of areas of the image.

10. The electronic device according to claim 9, wherein the processor is further configured to:
  unify dimensions of the question feature, the global feature, and the detection frame feature;
  equalize the dimension-unified global feature according to a number of the plurality of area features; and
  obtain the second weight according to the dimension-unified question feature, the dimension-unified detection frame feature, and the dimension-unified and equalized global feature.

11. The electronic device according to claim 7, wherein the processor is further configured to:
  unify the dimensions of the question feature, the global feature, and the detection frame feature;
  equalize the dimension-unified detection frame feature according to a number of the at least one detection frame sub-features; and
  obtain the first weight according to the dimension-unified question feature, the dimension-unified global feature, and the dimension-unified and equalized detection frame feature.

12. The electronic device according to claim 7, wherein the processor is further configured to:
  fuse the question feature and the area attention feature to obtain a first predicted answer to the question;
  fuse the question feature and the detection frame attention feature to obtain a second predicted answer to the question; and
  obtain the answer to the question by classifying the first predicted answer to the question and the second predicted answer to the question.

13. A non-transitory computer readable storage medium configured to store computer readable instructions, wherein when the computer readable instructions are executed, the following operations are performed:
  extracting a question feature representing a semantic meaning of a question, a global feature of an image, and a detection frame feature of a detection frame encircling an object in the image;
  obtaining a first weight of each of at least one area of the image and a second weight of each of at least one detection frame of the image according to the question feature, the global feature, and the detection frame feature;
  performing weighting processing on the global feature by using the first weight to obtain an area attention feature of the image;
  performing weighting processing on the detection frame feature by using the second weight to obtain a detection frame attention feature of the image; and
  predicting an answer to the question according to the question feature, the area attention feature, and the detection frame attention feature, wherein the extracting the detection frame feature of the detection frame encircling the object in the image comprises:
obtaining a plurality of detection frames encircling the object in the image by using a faster-region convolutional neural network;
determining at least one detection frame according to a difference between the object encircled by the plurality of detection frames and a background of the image;
extracting at least one detection frame sub-feature according to the at least one detection frame; and
obtaining the detection frame feature according to the at least one detection frame sub-feature.

14. The non-transitory computer readable storage medium according to claim 13, wherein the extracting the question feature representing the semantic meaning of the question comprises:
performing feature extraction on a context of words constituting the question by using a recurrent neural network to obtain the question feature.

15. The non-transitory computer readable storage medium according to claim 13, wherein the extracting the global feature of the image comprises:
extracting the global feature by using a convolutional neural network, wherein the global feature comprises a plurality of area features associated with a plurality of areas of the image.

16. The non-transitory computer readable storage medium according to claim 15, wherein the obtaining the second weight of each of at least one area of the image according to the question feature, the global feature, and the detection frame feature comprises:
unifying dimensions of the question feature, the global feature, and the detection frame feature;
equalizing the dimension-unified global feature according to a number of the plurality of area features; and
obtaining the second weight according to the dimension-unified question feature, the dimension-unified detection frame feature, and the dimension-unified and equalized global feature.

17. The non-transitory computer readable storage medium according to claim 13, wherein the obtaining the first weight of each of at least one area of the image according to the question feature, the global feature, and the detection frame feature comprises:
unifying the dimensions of the question feature, the global feature, and the detection frame feature;
equalizing the dimension-unified detection frame feature according to a number of the at least one detection frame sub-features; and
obtaining the first weight according to the dimension-unified question feature, the dimension-unified global feature, and the dimension-unified and equalized detection frame feature.

* * * * *